United States Patent [19]

Kamezaki

[11] 4,180,093

[45] Dec. 25, 1979

[54] AIR PRESSURE CONTROL APPARATUS FOR A HOT OR COLD STORAGE CHAMBER

[75] Inventor: Masaaki Kamezaki, Tokyo, Japan

[73] Assignee: Taisei Kosan Kabushiki Kaisha, Tokyo, Japan

[21] Appl. No.: 925,771

[22] Filed: Jul. 18, 1978

Related U.S. Application Data

[62] Division of Ser. No. 717,346, Aug. 24, 1976, Pat. No. 4,116,213.

[51] Int. Cl.² ............................................. F16K 17/18
[52] U.S. Cl. ...................................... 137/360; 49/21; 137/341; 137/493.9
[58] Field of Search ................... 49/21, 61, 65; 98/1.5, 98/119; 137/360, 493.9

[56] References Cited

U.S. PATENT DOCUMENTS

| | | | |
|---|---|---|---|
| 3,568,710 | 3/1971 | Boyer | 137/493.9 |
| 4,033,375 | 7/1977 | Hirsch | 137/493.9 |

FOREIGN PATENT DOCUMENTS

| | | | |
|---|---|---|---|
| 756862 | 4/1967 | Canada | 137/493.9 |
| 987363 | 3/1965 | United Kingdom | 98/119 |

Primary Examiner—Robert G. Nilson
Attorney, Agent, or Firm—Oblon, Fisher, Spivak, McClelland & Maier

[57] ABSTRACT

A regulator of air pressure within a hot or cold storage chamber which comprises a damper and frames. The damper is disposed within an opening provided at a wall of the storage chamber defining an air passage, and the frames are airtightly in contact with peripheral surfaces of the opening and the damper at the inside and outside of the storage chamber to close the air passage. The damper and either one of the frames are moveable in the inside or outside direction of the storage chamber in accordance with variations of air pressure within the storage chamber to thereby release the sealing of the air passage and establish pressure equilibrium between the inside and outside of the storage chamber.

3 Claims, 8 Drawing Figures

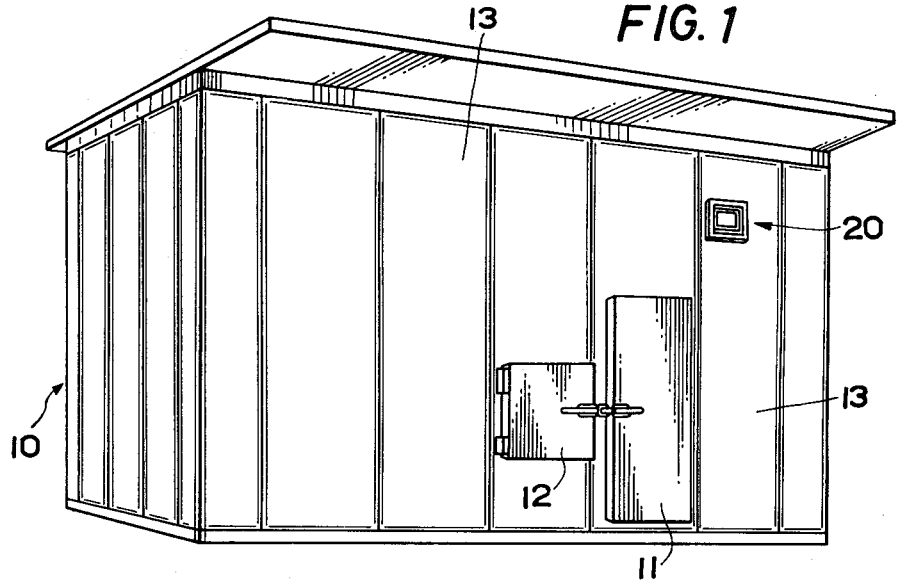
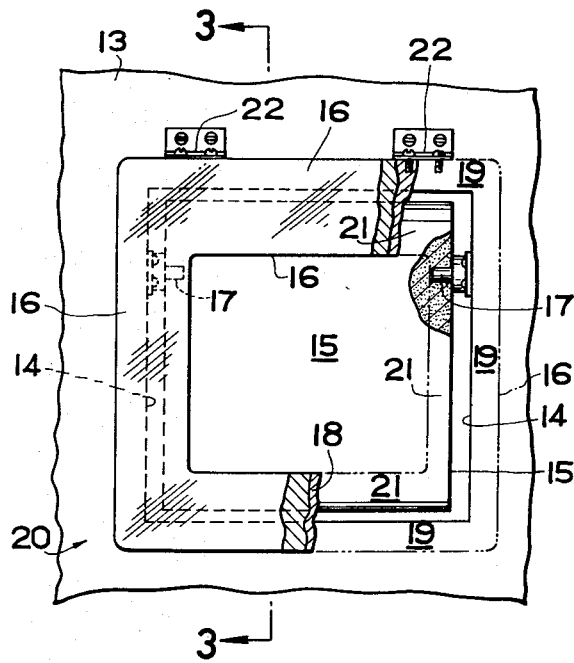
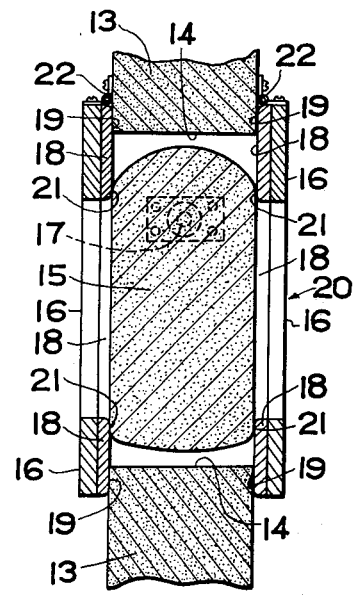

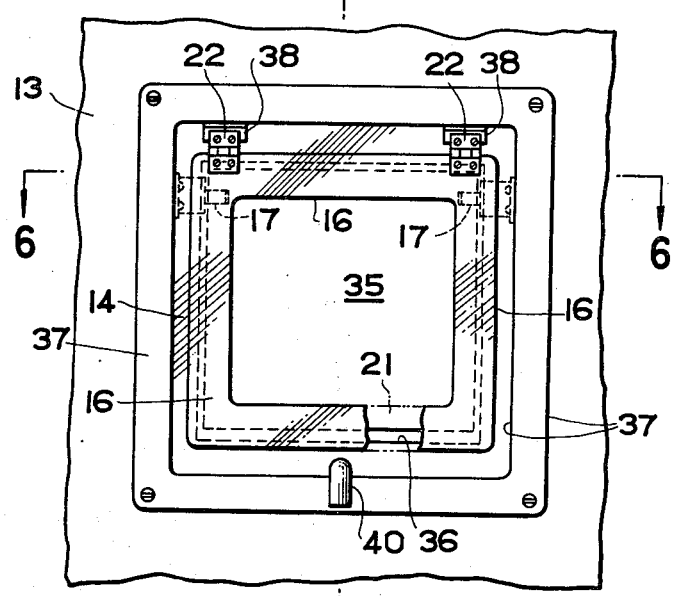
FIG. 4
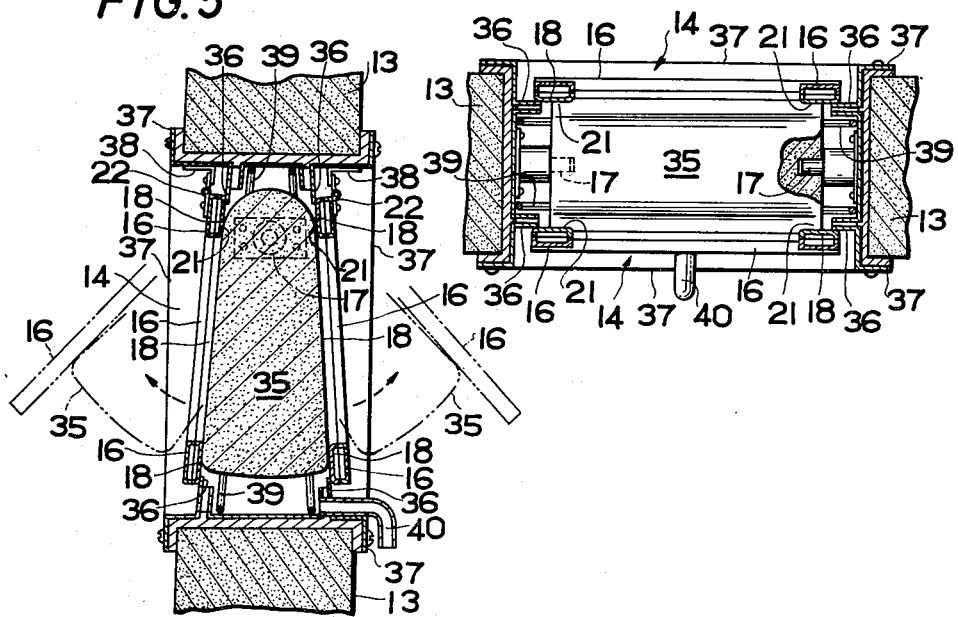
FIG. 5
FIG. 6

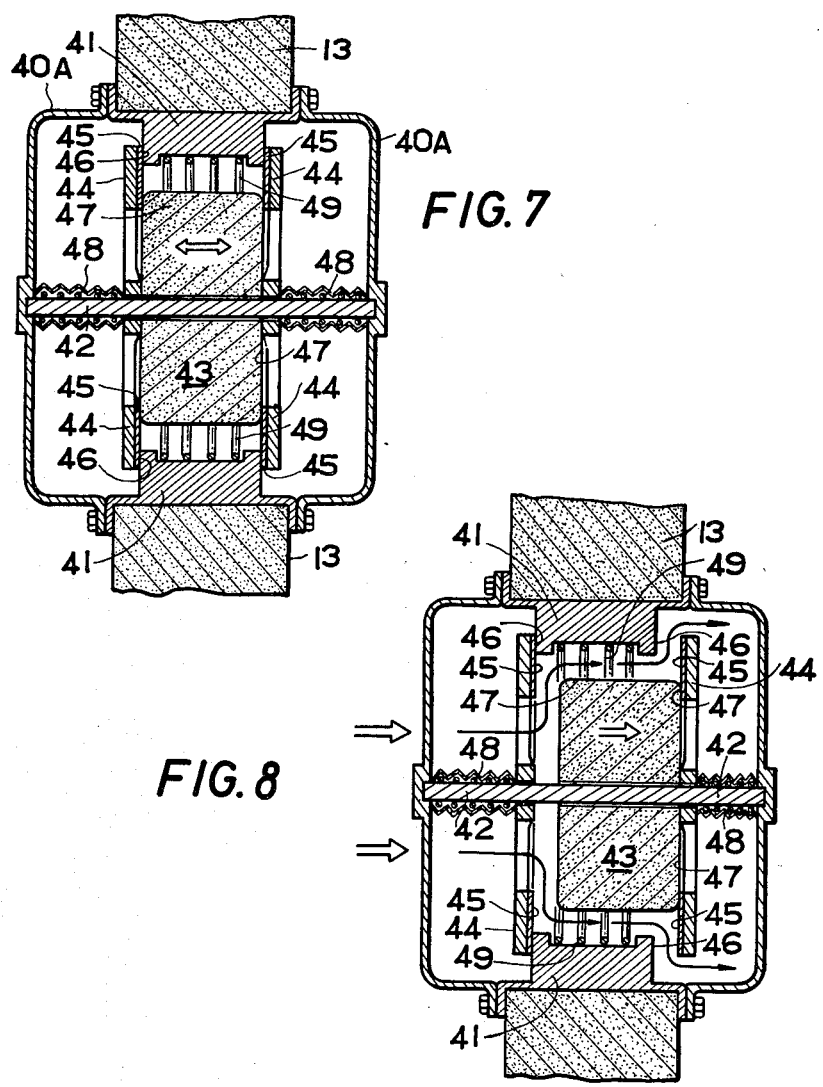

AIR PRESSURE CONTROL APPARATUS FOR A HOT OR COLD STORAGE CHAMBER

This is a division, of application Ser. No. 717,346 filed Aug. 24, 1976, now U.S. Pat. No. 4,116,213.

BACKGROUND OF THE INVENTION

This invention relates generally to an air pressure control apparatus, and more particularly to an automatic regulator of air pressure for various storage chambers such as for example freezers, refrigerators, hothouses, drying chambers, or cultivating chambers for various products, which are airtightly constructed and subjected to be heated or cooled.

When storage chambers such as large refrigerators or refrigeration warehouses which have been recently used for a cold storage of various perishable foods are subjected to use at a temperature below −35° C. or a quick freezing, air within the chamber is rapidly cooled at a low temperature, which results in a contraction of air within the chamber, and the chamber is maintained in reduced pressure as compared with the outside. As a consequence, an entrance door of the refrigerator is attracted to the inside of the chamber and the opening of the door is prevented.

When an evaporator of the refrigerator is defrosted with use of electric heater and a temperature within the chamber is significantly raised, air within the chamber is expanded to thereby increase the air pressure abruptly and causes the door to open by breaking a latch or handle of the door. Furthermore, when a temperature change within the chamber is remarkable due to a frequent opening and closing of the door, the opening of the door is prevented or it is unintentionally opened.

SUMMARY OF THE INVENTION

Therefore, the present invention contemplates to eliminate the above-mentioned disadvantages due to pressure difference between the inside and outside of the cold or hot storage chamber which is resulted from heating or cooling of the chamber.

It is an object of the present invention to provide an air pressure control apparatus for cold or hot storage chamber which is capable of achieving pressure equilibrium between the inside and outside of the chamber automatically without requiring any manual operation when the storage chamber experiences high or low pressure.

It is another object of the present invention to provide an air pressure control apparatus for cold or hot storage chamber which is simple in structure, easy to be installed, and economical to manufacture, and exhibits excellent performance of regulating the air pressure within the chamber in accordance with variations of the air pressure within the chamber.

It is still another object of the present invention to provide an air pressure control apparatus for cold or hot storage chamber which is actuated in response to variations of the air pressure within the chamber and free from any troubles. Thus, it can be used almost permanently.

It is a further object of the present invention is to provide an air pressure control apparatus for cold or hot storage chamber which completely closes a ventilation opening for escaping or introducing air when there is no variations of the air pressure within the chamber to thereby eliminate undesirable influences upon a thermal insulation of the chamber.

Briefly, the foregoing and the other objects are attained in accordance with one aspect of the present invention through the provision of a damper which is located in a window provided in a panel or wall of cold or hot storage chamber so as to have an air passage around the damper through which air within a storage chamber is ventilated. The damper is able to automatically shift the position in response to variations of air pressure within the chamber either in the inside or outside direction of the chamber to thereby open the window for introducing the outside air into the chamber or escaping the air within the chamber to the outside in order to establish pressure equilibrium between the inside and outside of the chamber. At the inside and outside walls of the chamber, there are provided frames or disks which airtightly close the air passage of the window and are moveable with the damper.

BRIEF DESCRIPTION OF THE DRAWINGS

Other objects, features and advantages of the present invention will be more apparent from the following description with reference to the accompanying drawings, wherein:

FIG. 1 is an overall perspective view of a hot or cold storage chamber which has an air pressure control apparatus according to the present invention;

FIG. 2 is a partially cutaway front view of the air pressure control apparatus installed in the hot or cold storage chamber according to the first embodiment of the present invention, FIG. 3 is a cross-sectional view taken along the line 3—3 of FIG. 2;

FIG. 4 is a partially cutaway front view of the air pressure control apparatus installed in the hot or cold storage chamber according to the second embodiment of the present invention;

FIG. 5 is a cross-sectional view taken along the line 5—5 FIG. 4 wherein actuated positions of the air pressure control apparatus are indicated in a phantom line;

FIG. 6 is a cross-sectional view taken along the line 6—6 of FIG. 4;

FIG. 7 is a cross-sectional view of the air pressure control apparatus according to the third embodiment of the present invention; and FIG. 8 is a cross-sectional view similar to FIG. 7 showing an actuated condition of the air pressure control apparatus.

DESCRIPTION OF A PREFERRED EMBODIMENT

Referring now to the drawings, wherein like reference numerals designate identical or corresponding parts throughout the several views and more particularly to FIGS. 1 to 3 thereof, a hot or cold storage chamber generally indicated by the reference numeral 10 is airtightly constructed and includes an entrance door 11 which gives access to an interior of the chamber 10 for a delivery of articles to be stored and a small door 12 for taking in and out the articles in small quantities or introducing a conveyor into the chamber 10. On a vertical wall of panel 13 of the chamber 10 which is made of a heat insulating material, such as for example foamed hard polyurethan resin, there is provided an opening 14 or a window which may be of square, rectangular or circular in shape and communicates the interior of the chamber 10 to the outside. The location of the opening 14 is not limited to the particular position shown in FIG. 1. It may be located at the entrance door 11.

An air pressure control apparatus generally indicated by the reference numeral 20 according to the first embodiment of the present invention shown in FIGS. 2 and 3 comprises a damper 15 and frames 16. The damper 15 is made of a heat insulating material having substantially the same shape as the window 14 and the same thickness as the wall 13 of the storage chamber 10. The damper 15 includes upper and lower round surfaces and is disposed within the window 14 so as to have an air passage around the periphery of the damper 15 by pivotally connecting the upper right and left sides thereof to pins 17 which are projected inwardly from the upper sides of the window 14 so that the damper 15 may be swingagle both inwardly and outwardly at the pivotal axes 17.

The frames 16 are formed in substantially the same shape as the window 14 and the damper 15 and include openings at the central portion thereof. The inside surfaces of the frames 16 are lined with pads 18 made of flexible synthetic rubber or the like which airtightly seal peripheral surfaces 19 and 21 of the window 14 and the damper 15 at both inside and outside walls of the storage chamber 10 extending over the air passage defined by the damper 15. The frames 16 are fixed to the upper sides of the window 14 by hinges 22 so that they may be released from the contact to the peripheral surfaces 19 and 21 of the window 14 and the damper 15 either in the inside or outside direction of the storage chamber 10 in accordance with the movement of the damper 15.

As explained hereinabove, the frames 16 include openings at the central portion thereof through which the damper 15 is exposed to the inside and outside of the storage chamber 10. Thus, air pressure within the storage chamber 10 is applied to the rear surface of the damper 15, while atmospheric air pressure is applied to the front surface of the damper 15. Therefore, when the air pressure within the storage chamber is significantly reduced by a quick freezing or the like, the atmospheric air pressure exerted on the front surface of the damper 15 becomes higher than the air pressure within the storage chamber 10, and the damper 15 is pushed by the atmospheric air pressure and attracted to the inside of the storage chamber 10. Then, the frame 16 fixed to the inside wall of the storage chamber to close the air passage is swung in the inside direction of the storage chamber 10 together with the damper 15 to thereby open the window 14 and permit the outside air to introduce into the chamber 10 through the window 14 so as to establish air pressure equilibrium between the inside and outside of the storage chamber 10. On this occasion, the frame 16 fixed to the outside wall of the storage chamber 10 is kept stationary, because it can not move in the inside direction of the storage chamber 10. The frame 16 and the damper 15 return to the initial position after the pressure equilibrium is established. When the air pressure within the chamber 10 becomes high due to an expansion of the air within the chamber 10 by heating the inside of the chamber in order to defrost, the higher air pressure within the chamber 10 is exerted on the rear surface of the damper 15, which causes the damper 15 and the frame 16 fixed to the outside wall of the storage chamber 10 to push in the outside direction of the storage chamber 10 to open the window 14 and permits the air within the chamber 10 to flow outside through the opened window so as to establish air pressure equilibrium between the inside and outside of the storage chamber 10. On this occasion, the frame 16 fixed to the inside wall of the storage chamber 10 is kept stationary, because it can not move in the outside direction of the storage chamber 10. The frame 16 and the damper 15 return to the initial position after the pressure equilibrium is established.

Reference is now made to FIGS. 4 to 6 which show the second embodiment of the present invention.

The air pressure control apparatus according to the second embodiment of the present invention is constructed basically of the same conception as the first embodiment of the present invention shown in FIGS. 2 and 3. A damper 35 according to the second embodiment of the present invention is generally of square and trapezoid configuration in the longitudinal cross section, which includes upper and lower round surfaces. The damper 35 is disposed within the window 14 provided on the panel or wall 13 of the storage chamber 10 so as to have the air passage around the periphery of the damper 35 by pivotally connecting upper right and left side thereof to the pins 17 which are projected inwardly from the upper right and left sides of the window 14 so that the damper 35 may be swingable at the pivotal axes 17 both in the inward and outward directions of the storage chamber 10.

The frames 16 include the openings at the central portion thereof and the inside surfaces of the frames 16 are lined with the pliable pads 18 which airtightly seal peripheral surfaces 36 and 21 of window frames 37 and the damper 35 extending over the air passages defined by the damper 35 at both inside and outside walls of the storage chamber 10.

The window frames 37 are secured to the inside and outside peripheral edges of the window 14 and include L-shaped lugs 38 at the undersides of the upper window frames to which the hinges 22 are riveted. The frames 16 are fixed to the window frames 37 by means of the hinges 22 so that they may be moveable either in the inside or outside directions of the storage chamber 10 when the damper 35 is actuated by air pressure.

Numeral 39 designates an electric heater for defrosting frost which is accumulated around the damper 35 and the frames 16 and obstructive of the actuation of the damper 35 and the frames 16. Numeral 40 designates a drain pipe for discharging water resulting from the defrosting.

The air pressure control apparatus according to the second embodiment of the present invention is operated almost in the same manner as the first embodiment of the present invention. In the second embodiment of the present invention, the damper 35 is formed of trapezoid shape increasing the cross sectional area from the upper part to the lower part thereof as shown in FIG. 4. Thus, the fixing state of the damper 35 within the window 14 can be stabilized, because the lower part of the damper 35 is heavier than the upper part thereof and the actuation of the damper 35 in response to the variation of the air pressure within the storage chamber 10 is controlled so as not to be too sensitive. Also, the frames 16 are fixed to the window 14 in a slanted manner so as to airtightly close the air passage defined by the damper 35 within the window 14 by hanging over the peripheral surfaces 36 and 21 of the window frames 37 and the damper 35 by their own weight. Thus, it makes possible to achieve satisfactory sealing of the lower peripheral surfaces of the window frames 37 and the damper 35 by the frames 16 which is liable to be imperfect.

Reference is now made to FIG. 7 and 8 which show the third embodiment of the present invention.

The air pressure control apparatus according to the third embodiment of the present invention includes a casing 40A having openings provided therein which is mounted to the opening provided on the panel or walls 13 of the storage chamber 10. The casing 40A includes a window frame 41 secured around the opening of the wall 13 and a shaft 42 extending horizontally within the casing at the central portion thereof. A damper 43 is mounted on the shaft 42 so as to be slidable along the shaft 42 defining the air passage within the opening. In addition, disks or plates 44 which are lined with flexible pads 45 and slidable along the shaft 42 are mounted on the shaft 42 so that they may be airtightly in contact with the inside and outside peripheral surfaces 46 and 47 of the window frame 41 and the damper 43 by compression springs 48. The disks 44 include openings at the central portion thereof through which the front and rear surfaces of the damper 43 are exposed to the outside and inside of the storage chamber 10. Numeral 49 designates an electric heater used for defrosting frost accumulated around the damper 45 and the disks 44.

When the air pressure within the storage chamber is significantly reduced by a quick freezing or the like, the damper 43 and the inside disk 44 are pushed by atmospheric air pressure exerted on the front surface of the damper 43 and retracted to the inside of the storage chamber sliding along the shaft 42 against bias of the compression spring 48 as shown in FIG. 8. Then, the outside air is introduced within the storage chamber to thereby establish air pressure equilibrium. As is apparent, the damper 43 and the outside disk 44 are pushed in the direction opposite to the position shown in FIG. 8 when the air pressure within the storage chamber becomes higher than the atmospheric air pressure.

Obviously, many modifications and variations of the present invention are possible in light of the above teachings. It is to be understood therefore that within the scope of the appended claims, the invention may be practiced otherwise than as specifically described herein.

What is claimed is:

1. An air pressure control apparatus for a hot or cold storage chamber which comprises:

a damper disposed in a window provided in a panel or wall of said storage chamber defining an air passage around a periphery of said damper for ventilating air within said storage chamber therethrough;

a shaft extending horizontally within said window slidably supporting said damper along said shaft so as to be slidable both inwardly and outwardly in response to variation of air pressure within said chamber;

first and second slidable frames for airtightly closing said air passage extending thereover mounted on said shaft and contacting with peripheral surfaces of said window and said damper at inside and outside walls of said storage chamber;

wherein said frames have openings at central portions thereof through which said damper is exposed to the inside and outside of said storage chamber and being moveable together with said damper, whereby said damper and one of said frames may be shiftable either in an inside or outside direction of said chamber releasing the airtight sealing of said air passage in accordance with variation of air pressure within said chamber so as to establish air pressure equilibrium between the inside and outside of said chamber.

2. An air pressure control apparatus for a hot or cold storage chamber as set forth in claim 1, which further comprises first and second compression springs mounted on said shaft such that said frames are contacted with peripheral surfaces of said window and said damper by means of said compression springs.

3. An air pressure control apparatus for a hot or cold storage chamber as set forth in claim 2, which further comprises:

inner and outer casing members secured to said window wherein said shaft is mounted within said inner and outer casing members.